US010022752B1

(12) United States Patent
Rothermel et al.

(10) Patent No.: US 10,022,752 B1
(45) Date of Patent: Jul. 17, 2018

(54) PACKAGE SORTING MODULE, SYSTEM, AND METHOD OF USING THE SAME

(71) Applicant: Amazon Technologies, Inc., Seattle, WA (US)

(72) Inventors: Kevin Rothermel, Seattle, WA (US); Sumit Bhangdiya, Seattle, WA (US); Mark Bosley, Seattle, WA (US); Daniel Jeffry Frank, Seattle, WA (US); Christopher Frederic Lobo, Seattle, WA (US); Chad Zagar, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/618,634

(22) Filed: Jun. 9, 2017

(51) Int. Cl.
*B07C 3/08* (2006.01)
*B65G 37/02* (2006.01)
*B65G 47/71* (2006.01)

(52) U.S. Cl.
CPC ................ *B07C 3/08* (2013.01); *B65G 37/02* (2013.01); *B65G 47/71* (2013.01); *B65G 2201/0285* (2013.01)

(58) Field of Classification Search
CPC .. B07C 3/08; B65G 37/02; B65G 2201/0285; B65G 47/71
USPC ................................ 198/349, 370.07–370.08
See application file for complete search history.

(56) References Cited

U.S. PATENT DOCUMENTS

| | | | | | |
|---|---|---|---|---|---|
| 1,439,825 | A * | 12/1922 | McClellan | B65G 23/00 198/346 |
| 4,081,078 | A * | 3/1978 | Richardson | B65G 47/71 198/436 |
| 4,658,947 | A * | 4/1987 | Welder | B65G 47/54 198/346.2 |
| 4,811,830 | A * | 3/1989 | Felder | B65G 1/0485 198/361 |
| 5,971,132 | A * | 10/1999 | Bonnet | B65G 47/54 198/370.07 |
| 6,005,211 | A * | 12/1999 | Huang | B07C 3/02 198/370.06 |
| 2003/0138312 | A1 * | 7/2003 | Watson | B65G 59/00 414/795.4 |
| 2004/0191050 | A1 * | 9/2004 | Lafontaine | B65G 37/02 414/791.6 |
| 2009/0099686 | A1 * | 4/2009 | Yoshikawa | B65G 37/02 700/228 |

(Continued)

*Primary Examiner* — Mark A Deuble
(74) *Attorney, Agent, or Firm* — Baker & Hostetler LLC

(57) ABSTRACT

In one embodiment, a package sorting system has a sorting module that has a sorting station, an infeed conveyor, and first and second pairs of outfeed conveyors. The sorting station has a front end, a rear end, and first and second sides. The infeed conveyor conveys packages from an infeed end to the front end along a rearward direction. The first pair has first and second outfeed conveyors that adjoin the first side and that convey packages away from one another along the rearward and frontward directions, respectively. The second pair has third and fourth outfeed conveyors that adjoin the second side and that convey packages away from one another along the rearward and frontward directions, respectively. In operation, a person or machine at the sorting station receives incoming packages from the infeed conveyor and selectively places each package on one of the first, second, third, and fourth outfeed conveyors.

25 Claims, 7 Drawing Sheets

(56) References Cited

U.S. PATENT DOCUMENTS

| | | | | |
|---|---|---|---|---|
| 2014/0277700 | A1* | 9/2014 | Maglaty | B65G 43/10 700/230 |
| 2015/0217334 | A1* | 8/2015 | Kim | B07C 3/02 209/552 |
| 2016/0355349 | A1* | 12/2016 | Chierego | B65G 23/36 |

* cited by examiner

PACKAGE SORTING MODULE, SYSTEM, AND METHOD OF USING THE SAME

BACKGROUND

In package handling facilities, such as package sorting centers, conveyors are commonly used to transport packages based on their ultimate shipping destination to the customer. For example, a package sorting center can have a plurality of conveyors, each conveyor corresponding to a different geographic region such as a set of zip codes. Each incoming package can be selectively placed onto one of the conveyors that corresponds to the ultimate shipping destination of the customer. The package is then conveyed on its respective conveyor to a staging area, where the package is placed on a pallet with other packages being delivered to the same zip code. The pallet can then be delivered to a postal service for forwarding on to customers.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

Figure 1:
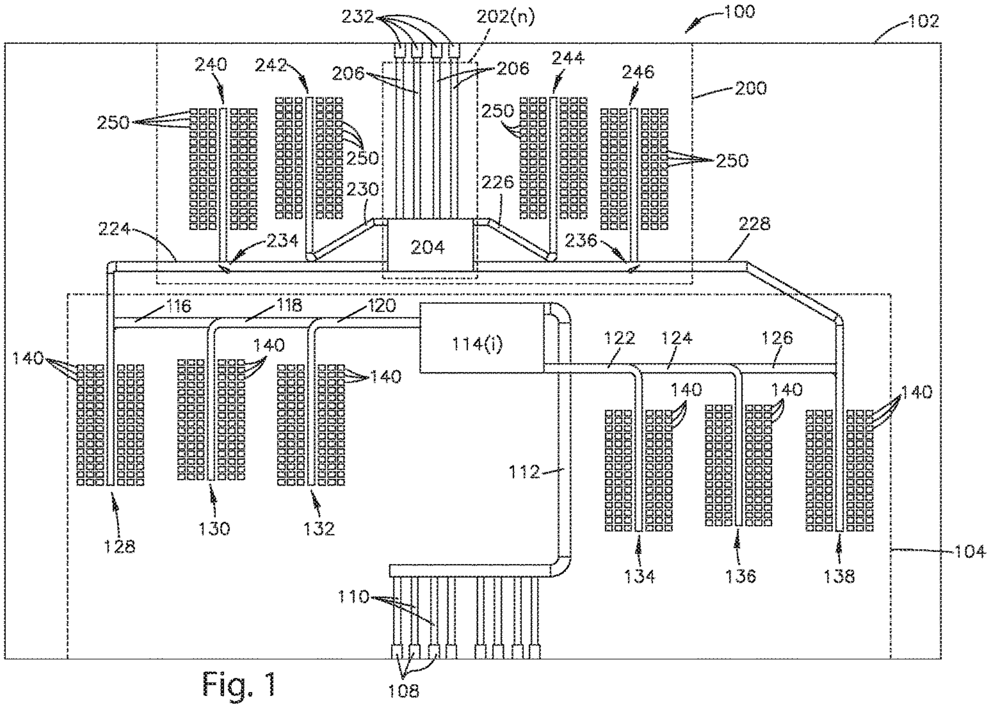
FIG. 1 shows a schematic diagram of a package handling facility according to one embodiment.

Referring to FIG. 1, a schematic diagram of a package handling facility 100 is shown according to one embodiment. In general, the package handling facility 100 receives customer packages on trucks, and sorts the packages according to the zip codes (or like geographic designation) of their ultimate shipping destinations to customers. Each package can be a container, an envelope, a bag, or a box such as a cardboard box, in which an object is contained, or can be any other package suitable for shipping to a customer. The package handling facility 100 has a building 102 that houses at least one sorting system that sorts the packages, such as a first sorting system 104 and a second sorting system 200. It will be understood that alternative embodiments can be implemented with only one of the first sorting system 104 and the second sorting system 200.

The first sorting system 104 has a plurality of loading docks 108, a plurality of unloading conveyors 110, an infeed conveyor 112, a plurality of sorting modules 114(1), where i is greater than one, a plurality of outfeed conveyors 116 to 126, and a plurality of staging areas 128 to 138. Each staging area 128 to 138 corresponds to a different geographic region such as a different zip code or a different set of zip codes. Further, each staging area 128 to 138 has at least one pallet 140, such as a plurality of pallets 140. Each pallet 140 in a staging area can correspond to a zip code. For example, each pallet 140 can correspond to a different zip code, or each subset of the pallets 140 in each staging area 128 to 138 can correspond to a different zip code. In this embodiment, the sorting system 104 has eight loading docks 108, six staging areas 128 to 138, and 96 pallets 140 in each staging area. However, it will be understood that at least one of the number of loading docks 108, the number of staging areas 128 to 138, and the number of pallets 140 can be less than or greater than that shown.

In operation, trucks carrying packages pull up to the loading docks 108 of the first sorting system 104. Each package has a customer shipping address including a zip code, and the packages carried by each truck are intermingled such that each truck carries packages corresponding to various zip codes. The packages carried by each truck are unloaded at a respective loading dock 108 onto a respective unloading conveyor 110. Once the packages from a truck are unloaded at a loading dock 108, the truck pulls away making room for a subsequent truck to deliver packages to the loading dock 108.

Each unloading conveyor 110 conveys its packages to an infeed conveyor 112 of the sorting system 104, where the packages from all of the unloading conveyors 110 (and hence from the loading docks 108) are intermingled onto the infeed conveyor 112. The infeed conveyor 112 conveys the intermingled packages to sorting modules 114(1) of the sorting system 104. At the sorting modules 114(1), a sorter, such as a person or machine, sorts the packages by selectively placing each package onto one of the outfeed conveyors 116 to 126 for delivery to a corresponding one of the staging areas 128 to 138. The sorter sorts the packages based on their ultimate shipping destination to the customer. In particular, packages to be delivered to the geographic region corresponding to the staging area 128 are placed on the outfeed conveyor 116, packages to be delivered to the geographic region corresponding to the staging area 130 are placed on the outfeed conveyor 118, packages to be delivered to the geographic region corresponding to the staging area 132 are placed on the outfeed conveyor 120, and so on. One or more operators at each staging area 128 to 138 selectively place each package received at the staging area onto one of the pallets 140 that corresponds to the zip code of the ultimate shipping destination to the customer.

Each staging area 128 to 138 of the first sorting system 104 has a maximum package handling rate (i.e., maximum capacity), which can be measured in packages per hour. When any one of the staging areas 128 to 138 reaches its maximum capacity, that staging area cannot accommodate additional packages until the handling rate decreases below the maximum capacity. Since each truck carries packages corresponding to various zip codes, it is possible that when one of the staging areas 128 to 138 reaches its maximum capacity, any further packages delivered to the loading docks 108 could be sorted to that staging area. Therefore, when any one of the staging areas 128 to 138 reaches its maximum capacity, the trucks can be diverted to the second sorting system 200 for sorting.

The second sorting system 200 has at least one loading dock 232, at least one sorting module 202(*n*), four accumulation conveyors 224, 226, 228, and 230, and four staging areas 240, 242, 244, and 246. Each staging area 240, 242, 244, and 246 corresponds to a different geographic region such as a different zip code or a different set of zip codes. Further, each of the staging areas 240, 242, 244, and 246 corresponds to a geographic region of one of the staging areas 128 to 138. For example, the staging area 240 corresponds to the geographic region of the staging area 130, the staging area 242 corresponds to the geographic region of the staging area 132, the staging area 244 corresponds to the geographic region of the staging area 134, and the staging area 246 corresponds to the geographic region of the staging area 136. Note that the sorting system 200 can be devoid of staging areas that correspond to the geographic regions of staging areas 128 and 138. Instead, the staging areas 128 and 138 can be shared between the first sorting system 104 and the second sorting system 200. Thus, the plurality of staging areas 128 to 138 of the first sorting system 104 can include at least one shared staging area that is shared between the first sorting system 104 and the second sorting system 200.

Each staging area 240 to 246 is configured in a manner similar to staging areas 130 to 136, respectively. Each staging area 240 to 246 has at least one pallet 250, such as a plurality of pallets 250. Each pallet 250 in a staging area can correspond to a zip code. For example, each pallet 250 can correspond to a different zip code, or each subset of the pallets 250 in each staging area 240 to 246 can correspond to a different zip code. In this embodiment, the sorting system 200 has four loading docks 232, and four sorting modules 202(*n*), four staging areas 240 to 246, and 96 pallets 250 in each staging area. However, it will be understood that at least one of the number of loading docks 232, the number of sorting modules 202(*n*), and the number of pallets 250 can be less than or greater than that shown.

In operation, trucks carrying packages pull up to the loading docks 232 of the second sorting system 200. Each package has a customer shipping address including a zip code, and the packages carried by each truck are intermingled such that each truck carries packages corresponding to various zip codes. The packages carried by each truck are unloaded at a respective loading dock 232 and placed onto a respective infeed conveyor 206 of a sorting module 202(*n*). Once the packages from a truck are unloaded at a loading dock 232, the truck pulls away making room for a subsequent truck to deliver packages to the loading dock 232.

Each infeed conveyor 206 of the sorting system 200 conveys its intermingled packages to a sorting station 204 of the sorting system 200. At the sorting stations 204, a sorter, such as a person or machine, sorts each package onto one of the four accumulation conveyors 224 to 230 as will be described in further detail below. The sorter sorts the packages based on their ultimate shipping destination to the customer.

The first accumulation conveyor 224 is configured to selectively convey each package that it receives to one of i) the first staging area 240 and ii) the shared staging area 128. The first accumulation conveyor 224 can include an automatic diverter 234, such as a pneumatic diverter, that selectively diverts each package to one of i) the first staging area 240 and ii) the shared staging area 128. Alternatively, the diverter 234 can be a person that selectively diverts each package to one of i) the first staging area 240 and ii) the shared staging area 128. The second accumulation conveyor 226 is configured to convey each package that it receives to the third staging area 244. The third accumulation conveyor 228 is configured to selectively convey each package that it receives to one of i) the fourth staging area 246 and ii) the shared staging area 138. The third accumulation conveyor 228 can include an automatic diverter 236, such as a pneumatic diverter, that selectively diverts each package to one of i) the fourth staging area 246 and ii) the shared staging area 138. Alternatively, the diverter 236 can be a person that selectively diverts each package to one of i) the fourth staging area 246 and ii) the shared staging area 138. The fourth accumulation conveyor 230 is configured to convey each package that it receives to the second staging area 242. At each staging area 240 to 246, at least one operator selectively places each package received at the staging area onto one of the pallets 140 that corresponds to the zip code of the ultimate shipping destination to the customer.

Figure 2:
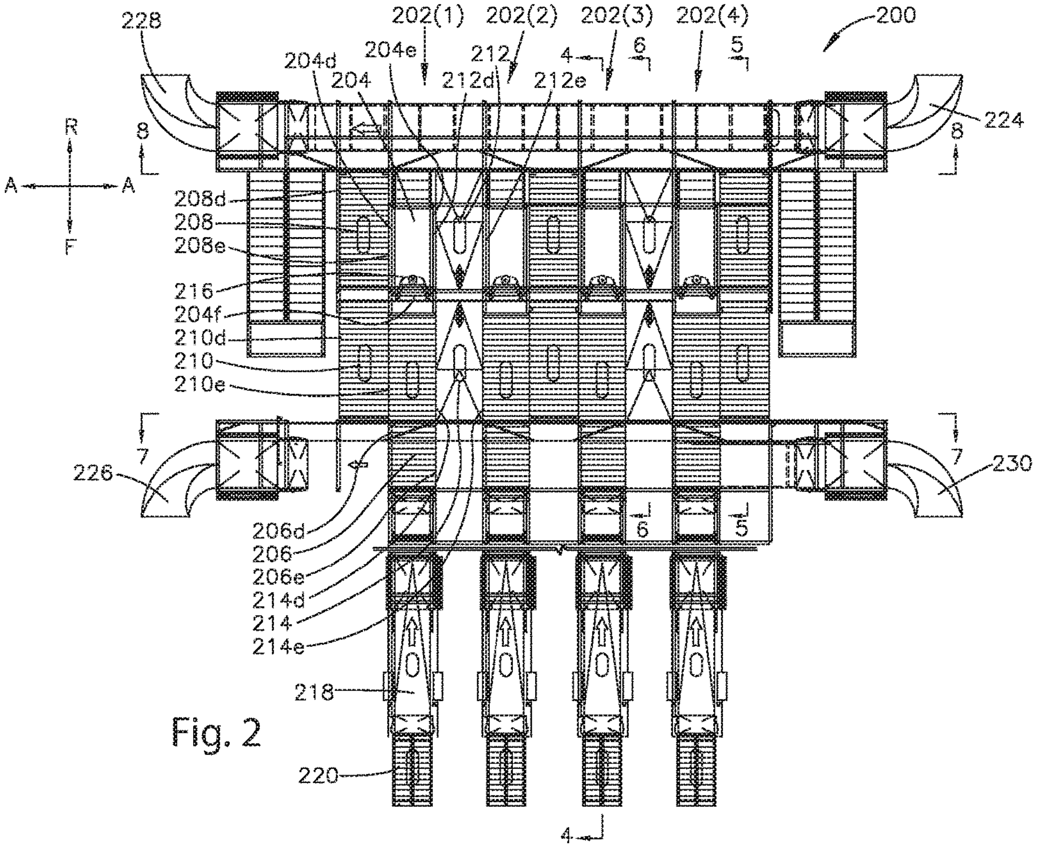
FIG. 2 shows a top plan view of a second package sorting system of the package handling facility of FIG. 1 according to one embodiment with staging areas removed for illustrative purposes.
Figure 3:
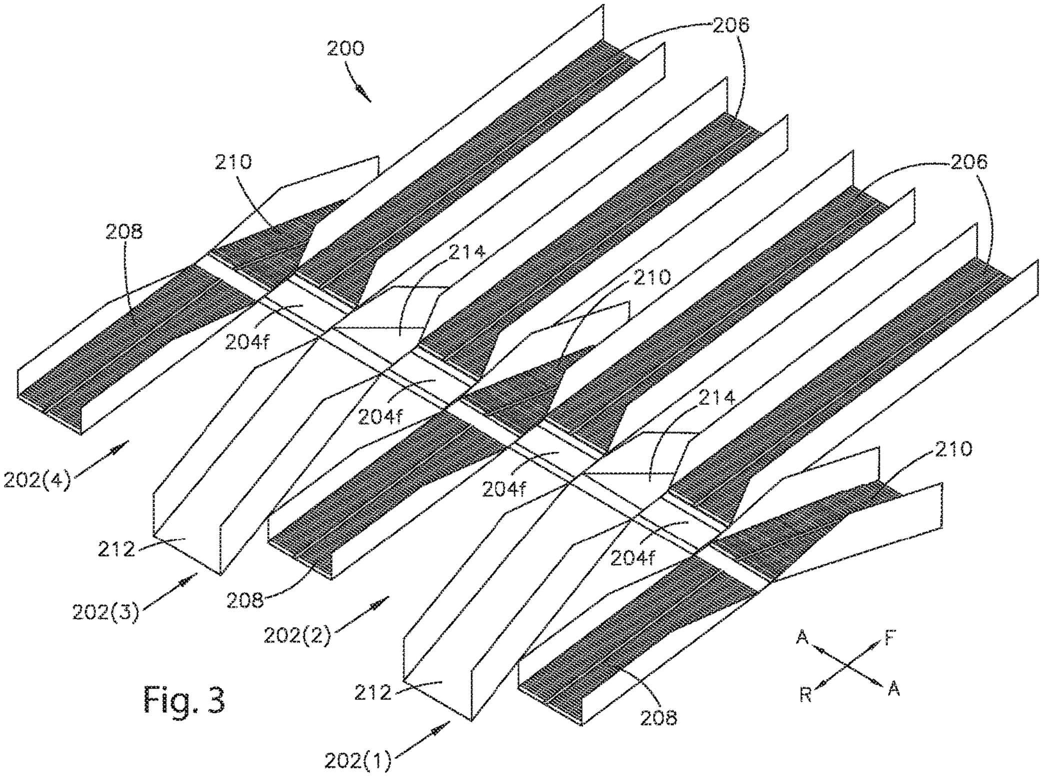
FIG. 3 shows a perspective view of the second package sorting system of FIG. 2 with the support structure, sorting stations, and staging areas removed for illustrative purposes.

Referring to FIGS. 2 and 3, the details of the second package sorting system 200 will now be described. In general, the system 200 has at least one sorting module 202(*n*), such as a plurality of sorting modules 202(*n*), that may be used to sort packages in a package handling facility, where n=N−1 or n=1, . . . , N. In FIGS. 2-8, the system 200 has N=4 sorting modules 202(*n*); however, in alternative embodiments, the system can have as few as N=1 sorting module 202(*n*) or greater than N=4 sorting modules 202(*n*). Each sorting module 202(*n*) comprises a sorting station 204, an infeed conveyor 206, a first pair of outfeed conveyors having first and second outfeed conveyors 208 and 210, and a second pair of outfeed conveyors having third and fourth outfeed conveyors 212 and 214. The system 200 can include first to fourth accumulation conveyors 224 to 230 configured to receive packages from the first to fourth outfeed conveyors 108 to 114, respectively, and carry the packages to first to fourth staging areas, respectively.

Each sorting station 204 is configured to support a package sorter 216, which can be a person or machine. In embodiments that employ a machine sorter, the machine can include an automated reader, such as (without limitation) a bar code reader, a two-dimensional code reader such as a QR code reader, or a machine vision system that interprets text or images. The machine can also include an ejector such as a pneumatically actuated arm or diverter that diverts each package to one of the first to fourth outfeed conveyors.

Each sorting module 202(*n*) is configured such that its package sorter 216 can receive incoming packages at the sorting station 204 from the infeed conveyor 206 and selectively place each package on one of the first, second, third, and fourth outfeed conveyors 208, 210, 212, and 214 for delivery to one of the staging areas 128, 240, 242, 244, 246, and 138. Each sorting module 202(*n*) is configured so as to limit the amount that the package sorter 216 needs to physically turn in order to receive packages from the infeed conveyor 206 and selectively place the packages on the first, second, third, and fourth outfeed conveyors 208, 210, 212, and 214. Further, each sorting module 202(*n*) is configured to limit the amount of lifting performed by the package sorter 216. Thus, each sorting module 202(*n*) can be ergonomically friendly for the package sorter 216. This can reduce stress on the sorter 216 that could otherwise cause injury (if a person) or malfunction (if an automated system) to the package sorter 216.

Referring generally to the arrangement of the sorting modules 202(*n*), the sorting station 204 of each sorting module 202(*n*) is between a first outfeed conveyor 208 and a third outfeed conveyor 212 of the sorting module 202(*n*) with respect to the lateral direction A. The infeed conveyor 206 of each sorting module 202(*n*) is between a second outfeed conveyor 210 and a fourth outfeed conveyor 214 of the sorting module 202(*n*) with respect to the lateral direction A. In embodiments such as in FIGS. 1 and 2 that have a plurality of sorting modules 202(*n*), each sorting module 202(*n*) can share at least one pair of outfeed conveyors with an adjacent sorting module 202(*n*). Thus, the sorting system 200 can have [2*(1+N)] total outfeed conveyors, where the number N of sorting modules 202(*n*) is greater than one. It will be understood that, in alternative embodiments, at least one sorting module 202(*n*) can have its own first to fourth outfeed conveyors 208 to 214 that are not shared with another sorting module 202(*n*).

In FIGS. 2 and 3, a first outfeed conveyor 208 is between an adjacent pair of sorting stations 204 with respect to the lateral direction A. Similarly, a third outfeed conveyor 212 is between an adjacent pair of sorting stations 204 with respect to the lateral direction A. Further, a outfeed conveyor 210 is between an adjacent pair of infeed conveyors 206 with respect to the lateral direction A. Similarly, a fourth outfeed conveyor 214 is between an adjacent pair of infeed conveyors 206 with respect to the lateral direction A. In some embodiments, not shown in the figures, there may be more than one outfeed conveyor at each location 208, 210, 212, and 214. Preferably, the system 202 has a first repeating pattern along the lateral direction A as follows: sorting station 204, first outfeed conveyor 208, sorting station 204, and third outfeed conveyor 212. Further, the system has a second repeating pattern along the lateral direction A, opposite conveyors 208 and 212, as follows: infeed conveyor 206, second outfeed conveyor 210, infeed conveyor 206, and fourth outfeed conveyor 214. The first repeating pattern is offset from the second repeating pattern along the rearward direction R.

Figure 4:
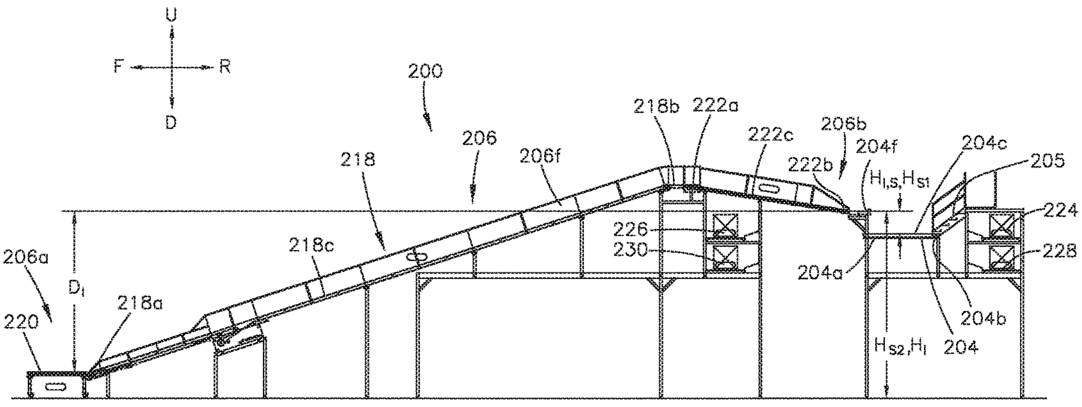
FIG. 4 shows a cross-sectional elevation view of the package sorting system of FIG. 2 taken at section 4-4.

Referring now to FIGS. 2 and 4, the features of each sorting module 202(*n*) will be described in further detail. Each sorting station 204 has a front end 204*a*, and a rear end 204*b* spaced from the front end 204*a* along a rearward direction R. The rear end 204*b* can optionally include a set of stairs 205 for the sorter 216 to access the sorting station 204. Each sorting station 204 can optionally include a sorting surface 204*f* at its front end 204*a*. Each sorting surface 204*f* can be planar and can provide a surface for the sorter 216 to sort packages. Each sorting station 204 can optionally have a bottom surface 204*c* configured to support a respective one of the package sorters 216. Each sorting surface 204*f* can be spaced from the bottom surface 204*c* of a respective one of the sorting stations 204 by a height $H_{S1}$, where $H_{S1}$ is greater than or equal to zero. The height $H_{S1}$ can be at counter height for a person. In preferred embodiments, the height $H_{S1}$ is between zero feet and four feet. Each sorting surface 204*f* can also be spaced from the ground by a height $H_{S2}$.

Each sorting station 204 has a first lateral side 204*d*, and a second lateral side 204*e* spaced from the first lateral side 204*d* along a lateral direction A, perpendicular to both the rearward direction R and a forward direction F, opposite the rearward direction. The first and second lateral sides 204*d* and 204*e* can be spaced from one another such that the first and second lateral sides 204*d* and 204*e* are each an arm's length from the sorter 216 when the sorter 216 is positioned midway between the first and second lateral sides 204*d* and 204*e*. For example, the first and second lateral sides 204*d* and 204*e* can be spaced from one another by a distance that is less than or equal to six feet. In preferred embodiments, the first and second lateral sides 204*d* and 204*e* are spaced from one another by a distance between two feet and five feet.

With continued reference to FIGS. 2 and 4, each infeed conveyor 206 has an infeed end 206*a*, and a discharge end 206*b* offset from the infeed end 206*a* along the rearward direction R. Each infeed conveyor 206 has a first lateral side 206*d*, and a second lateral side 206*e* spaced from the first lateral side 206*d* along the lateral direction A. The first and second lateral sides 206*d* and 206*e* are parallel to one another, although embodiments of the disclosure are not so limited. Each lateral side 206*d* and 206*e* can optionally have a sidewall 206*f* configured to prevent packages from falling off of the infeed conveyor 206. Each infeed conveyor defines an infeed conveying surface 206*c* that extends from its infeed end 206*a* to its discharge end 206*b*. Further, each discharge end 206*b* is disposed at the front end 204*a* of a respective one of the sorting stations 204. For example, each discharge end 206*b* can terminate at a respective sort surface 204*f*. Thus, each infeed conveyor 206 extends linearly from its infeed end 206*a* to the front end 204*a* of a respective one of the sorting stations 204 along the rearward direction R. Note that, in alternative embodiments, each infeed conveyor 206 can curve as it extends from its infeed end 206*a* to the front end 204*a* of a respective one of the sorting stations 204.

The sorting station 204 can be elevated relative to the infeed end 206*a* of each infeed conveyor 206. Further, the discharge end 206*b* of each infeed conveyor 206 can be offset from the infeed end 206*a* of the infeed conveyor 206 along an upward direction U such that the discharge end 206*b* is elevated relative to the infeed end 206*a*. Stated differently, the discharge end 206*b* of each infeed conveyor 206 can be spaced from the ground by a discharge height $H_I$, and the infeed end 206*a* of the infeed conveyor 206 can be offset from the discharge end 206*b* along a downward direction D by a distance $D_I$, where $D_I$ is greater than zero but less or equal to than $H_I$. Each discharge end 206*b* can vertically aligned with the sorting surface 204*f* of a respective one of the sorting stations 204. Thus, the height $H_I$ can be substantially equal to the height $H_{S2}$ of a respective sorting surface 204*f*. Each discharge end 206*b* can also be spaced from the bottom surface 204*c* of a respective one of the sorting stations 204 by a height $H_{I,S}$, where $H_{I,S}$ is greater than or equal to zero. The height $H_{I,S}$ can be substantially equal to the height $H_{S1}$ of a respective sorting surface 204*f*.

Each infeed conveyor 206 is configured to receive packages at its infeed end 206*a* and to convey packages along an infeed direction from its infeed end 206*a* to the front end 204*a* of the respective one of the sorting stations 204. Each infeed conveyor 206 includes a powered conveyor segment 218 between its infeed end 206*a* and its discharge end 206*b*. Each powered conveyor segment 218 has an upstream end 218*a* and a downstream end 218*b* that is offset from the upstream end 218*a* along the rearward direction R. Each powered conveyor segment 218 can be inclined as the powered conveyor segment 218 extends from its upstream end 218*a* to its downstream end 218*b* along the rearward direction R. Further, each powered conveyor segment 218 defines a conveying surface 218*c* that extends from its upstream end 218*a* to its downstream end 218*b*. Each powered conveyor segment 218 can include any suitable conveying mechanisms such as (without limitation) a conveyor belt, mesh, rollers, and skate wheels that define the conveying surface 218*c*. Each conveying surface 218*c* can be controlled by a motor that moves the conveying surface 218*c* so as to convey packages along the rearward direction R. The motor can in turn be controlled by a controller that controls the speed in which the conveying surface 218*c* conveys the packages.

Each infeed conveyor 206 can optionally include a loading conveyor segment 220 at the infeed end 206*a* of the infeed conveyor 206. Each loading conveyor segment 220 can have an upstream end 220*a* and a downstream end 220*b* that is offset from the upstream end 220*a* along the rearward direction R. Each downstream end 220*b* can adjoin an upstream end 218*a* of a respective powered conveyor segment 218. Further, each loading conveyor segment 220 can be level from its upstream end 220*a* to its downstream end 220*b* such that the upstream and downstream ends 220*a* and 220*b* are vertically aligned with one another. Each loading conveyor segment 220 can include any suitable conveying mechanisms such as (without limitation) rollers and skate wheels that define the conveying surface 222*c*.

Each infeed conveyor 206 can optionally include a gravity-fed accumulation conveyor segment 222 between the powered conveyor segment 218 and the discharge end 206*b* of the infeed conveyor 206. Each accumulation conveyor segment 222 can have an upstream accumulation end 222*a* and a downstream accumulation end 222*b* that is offset from the upstream accumulation end 222*a* along the rearward direction R. In at least some embodiments, each downstream accumulation end 222*b* can define the discharge end 206*b* of a respective one of the infeed conveyors 206. Further, in at least some embodiments, each upstream accumulation end 222*a* can adjoin a downstream accumulation end 218*b* of a respective powered conveyor segment 218. Each accumulation conveyor segment 222 can be declined as the accumulation conveyor segment 222 extends from its upstream accumulation end 222*a* to its downstream accumulation end 222*b* along the rearward direction R. Thus, the downstream accumulation end 222*b* of each accumulation conveyor segment 222 can be offset from its upstream accumulation end 222*a* and the downstream accumulation end 218*b* of a respective powered conveyor segment 218 along the downward direction D.

Each accumulation conveyor segment 222 defines an accumulation conveying surface 222*c* that extends from its upstream accumulation end 222*a* to its downstream accumulation end 222*b*. Each accumulation conveyor segment 222 can include any suitable conveying mechanisms such as (without limitation) rollers and skate wheels that define the conveying surface 222*c*. Each conveying surface 222*c* can be unpowered and can be configured to move in response to gravity pulling packages down the conveying surface 222*c* towards its downstream accumulation end 222*b* along the rearward direction R. In some embodiments, each accumulation conveyor segment 222 can include downhill package speed limiters configured to limit movement of its conveying surface 222*c* so as to limit a speed in which the packages convey along its conveying surface 222*c*. For example, the speed limiters can be configured so as to convey packages along each conveying surface 222*c* at a speed that is slower than the speed in which packages are conveyed along each powered conveying surface 220*c*. Each speed limiter can be a roller or skate wheel having a large moment of inertia that limits downhill speed of packages.

Figure 5:
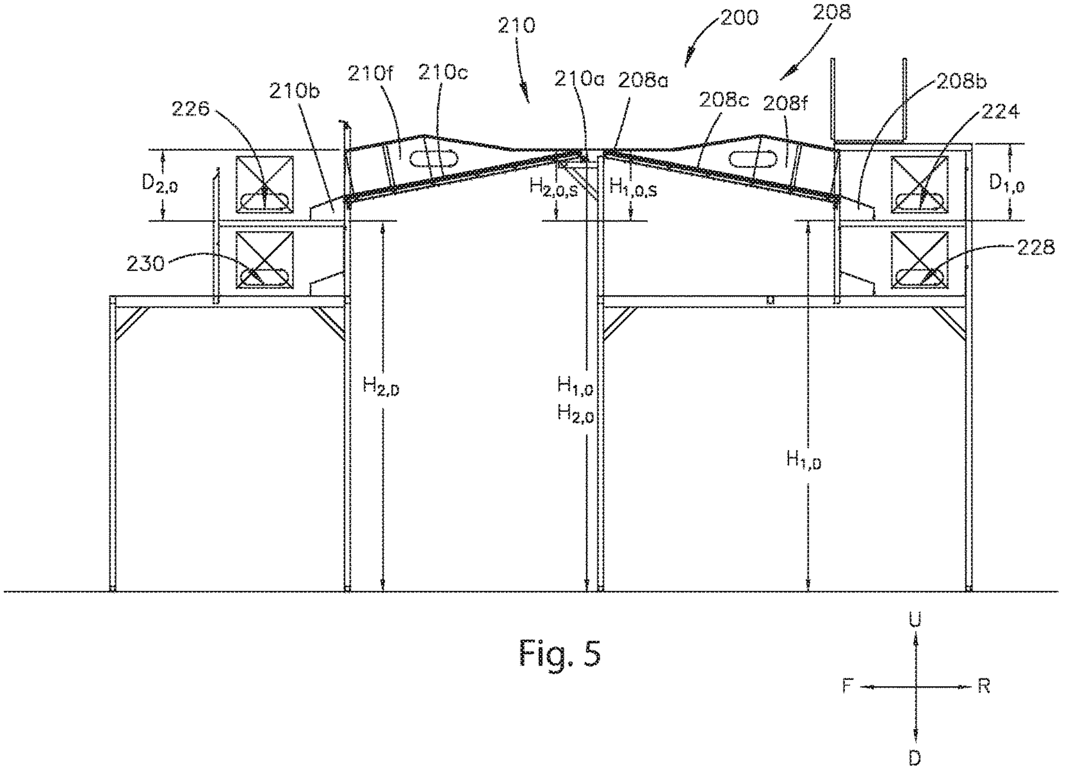
FIG. 5 shows a cross-sectional elevation view of the package sorting system of FIG. 2 taken at section 5-5.

Turning now to FIGS. 2, 3, and 5, each first pair of outfeed conveyors includes first and second outfeed conveyors 208 and 210. The first and second outfeed conveyors 208 and 210 of each first pair adjoin one of the first and second lateral sides 204*d* and 204*e* of a respective one of the sorting stations 204. The first and second outfeed conveyors 208 and 210 of each first pair can be arranged end-to-end with one another. The first and second outfeed conveyors 208 and 210 of each first pair can extend away from one another. For example, the first outfeed conveyor 208 of each first pair can extend away from the second outfeed conveyor 210 of the first pair along the rearward direction R. Further, the second outfeed conveyor 210 of each first pair can extend away from the first outfeed conveyor 208 of the first pair along the forward direction F.

Each first outfeed conveyor 208 has an outfeed end 208*a*, and a discharge end 208*b* offset from the outfeed end 208*a* along the rearward direction R. Each first outfeed conveyor 208 has a first lateral side 208*d*, and a second lateral side 208*e* spaced from the first lateral side 208*d* along the lateral direction A. The first and second lateral sides 208*d* and 208*e* are parallel to one another, although embodiments of the disclosure are not so limited. Each of the first and second lateral sides 208*d* and 208*e* can optionally have a sidewall 208*f* configured to prevent packages from falling off of the first outfeed conveyor 208.

Each first outfeed conveyor 208 extends linearly from its outfeed end 208*a* to its discharge end 208*b* along the rearward direction R. For example, each first outfeed conveyor 208 extends away from a respective second outfeed conveyor 210 along the rearward direction R. Note that, in alternative embodiments, each first outfeed conveyor 208 can curve as it extends from its outfeed end 208*a* to its discharge end 208*b*.

Each outfeed end 208*a* is disposed closer to the front end 204*a* of a respective sorting station 204 than to the rear end 204*b*. For example, each outfeed end 208*a* can be aligned with the sorting surface 204*f* at the front end 204*a* of a respective sorting station 204 along the lateral direction A. Each outfeed end 208*a* can be additionally or alternatively be vertically aligned with the sorting surface 204*f*. Further, the outfeed end 208*a* of each first outfeed conveyor 208 adjoins one of the first and second lateral sides 204*d* and 204*e* of a respective one of the sorting stations 204. For example, each outfeed end 208*a* can extend away from the one of the first and second lateral sides 204*d* and 204*e* of a respective one of the sorting stations 204 along the lateral direction A. The outfeed end 208*a* of each first outfeed conveyor 208 can adjoin an outfeed end 210*a* of a corresponding second outfeed conveyor 210. Thus, the outfeed ends 208*a* and 210*a* of each first pair of first and second outfeed conveyors 208 and 210 can be arranged end-to-end.

Each first outfeed conveyor 208 is declined as it extends from its outfeed end 208*a* to its discharge end 208*b*. Thus, the discharge end 208*b* of each first outfeed conveyor 208 is offset from the outfeed end 208*a* of the outfeed conveyor 208 along the downward direction D such that the outfeed end 208*a* is elevated relative to the discharge end 208*b*. The outfeed end 208*a* of each first outfeed conveyor 208 can be spaced from the ground by an outfeed height $H_{1,O}$, and the discharge end 208*b* of the first outfeed conveyor 208 can be offset from the outfeed end 208*a* along a downward direction D by a distance $D_{1,O}$, where $D_{1,O}$ is greater than zero but less or equal to than $H_{1,O}$. Each outfeed end 208*a* can be vertically aligned with at least one of the discharge end 206*b* of the infeed conveyor 206 and the sorting surface 204*f* of a respective one of the sorting stations 204. Thus, the height $H_{1,O}$ can be substantially equal to at least one of the height $H_I$ and the height $H_{S2}$. Each outfeed end 208*a* can also be spaced from the bottom surface 204*c* of a respective one of the sorting stations 204 by a height $H_{1,O,S}$, where $H_{1,O,S}$ is greater than or equal to zero. The height $H_{1,O,S}$ can be substantially equal to at least one of the height $H_{I,S}$ and the height $H_{S1}$.

Figure 8:
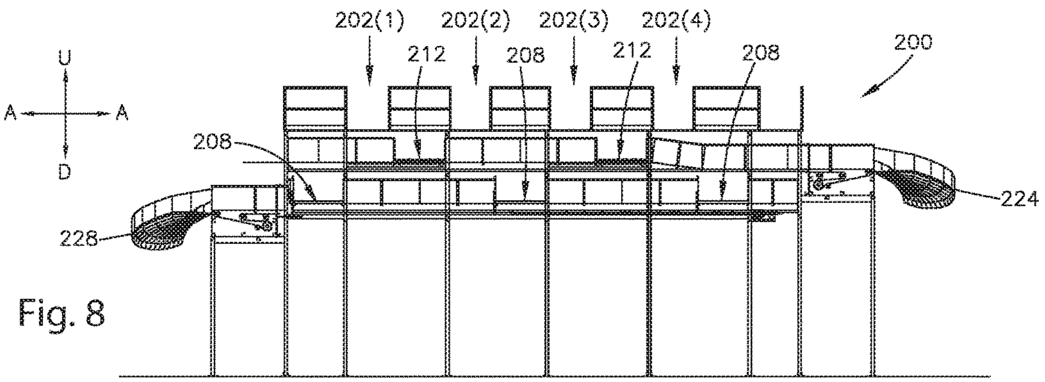
FIG. 8 shows a cross-sectional elevation view of the package sorting system of FIG. 2 taken at section 8-8.

Each first outfeed conveyor 208 is configured to receive packages at its outfeed end 208*a* and to convey packages from its outfeed end 208*a* to its discharge end 208*b* along the rearward direction R. The discharge ends 208*b* of the sorting modules 202(*n*) can each be in communication with the first accumulation conveyor 224 that conveys packages from the discharge ends 208*b* towards at least one staging area (e.g., staging areas 128 and 240 of FIG. 1). Thus, it can be said that each first outfeed conveyor 208 conveys packages from its outfeed end 208*a* to the first accumulation conveyor 224. At least a portion of the first accumulation conveyor 224 can extend along the lateral direction A (as shown in FIG. 8) such that each first outfeed conveyor 208 is in communication into the first accumulation conveyor 224. The first accumulation conveyor 224 can be spaced from the ground by a distance $H_{1,D}$.

Each first outfeed conveyor 208 defines an outfeed conveying surface 208*c* that extends from its outfeed end 208*a* to its discharge end 208*b*. Each first outfeed conveyor 208 includes a plurality of skate wheels that define its conveying surface 208*c*. However, in alternative embodiments, each first outfeed conveyor 208 can include any other suitable conveying mechanism such as (without limitation) a slide, rollers, or belt that defines the conveying surface 208*c*.

Each conveying surface 208*c* can be unpowered, and can be configured to move in response to gravity pulling packages down the conveying surface 208*c* towards its discharge end 208*b* along the rearward direction R. It will also be understood that, in alternative embodiments, the discharge end 208*b* of each first outfeed conveyor 208 can be at the same elevation as, or at a higher elevation than, the outfeed end 208*a* of the first outfeed conveyor 208. Additionally or alternatively, in some embodiments, each first outfeed conveyor 208 can be powered, and each conveying surface 208*c* can be controlled by a motor that moves the conveying surface 208*c* so as to convey packages along the rearward direction R. The motor can in turn be controlled by a controller that controls the speed in which the conveying surface 208*c* conveys the packages.

With continued reference to FIGS. 2, 3, and 5, each second outfeed conveyor 210 has an outfeed end 210*a*, and a discharge end 210*b* offset from the outfeed end 210*a* along the forward direction F. Each second outfeed conveyor 210 has a first lateral side 210*d*, and a second lateral side 210*e* spaced from the first lateral side 210*d* along the lateral direction A. The first and second lateral sides 210*d* and 210*e* are parallel to one another, although embodiments of the disclosure are not so limited. Each of the first and second lateral sides 210*d* and 210*e* can optionally have a sidewall 210*f* configured to prevent packages from falling off of the second outfeed conveyor 210.

Each second outfeed conveyor 210 extends linearly from its outfeed end 210*a* to its discharge end 210*b* along the forward direction F. Further, each second outfeed conveyor 210 extends away from a respective first outfeed conveyor 208 along the forward direction F. Note that, in alternative embodiments, each second outfeed conveyor 210 can curve as it extends from its outfeed end 210*a* to its discharge end 210*b*.

Each outfeed end 210*a* is disposed closer to the front end 204*a* of a respective sorting station 204 than to the rear end 204*b*. For example, each outfeed end 210*a* can be aligned with the sorting surface 204*f* at the front end 204*a* of a respective sorting station 204 along the lateral direction A. Each outfeed end 210*a* can be additionally or alternatively be vertically aligned with the sorting surface 204*f*. Further, the outfeed end 210*a* of each second outfeed conveyor 210 adjoins one of the first and second lateral sides 204*d* and 204*e* of a respective one of the sorting stations 204. For example, each outfeed end 210*a* can extend from the one of the first and second lateral sides 204*d* and 204*e* of a respective one of the sorting stations 204 along the lateral direction A. The outfeed end 210*a* of each second outfeed conveyor 210 can adjoin an outfeed end 208*a* of a corresponding first outfeed conveyor 208. Thus, the outfeed ends 208*a* and 210*a* of each first pair of first and second outfeed conveyors 208 and 210 can be arranged end-to-end.

Each second outfeed conveyor 210 is declined as it extends from its outfeed end 210*a* to its discharge end 210*b*. Thus, the discharge end 210*b* of each second outfeed conveyor 210 is offset from the outfeed end 210*a* of the second outfeed conveyor 210 along the downward direction D such that the outfeed end 210*a* is elevated relative to the discharge end 210*b*. The outfeed end 210*a* of each second outfeed conveyor 210 can be spaced from the ground by an outfeed height $H_{2,O}$, and the discharge end 210*b* of the second outfeed conveyor 210 can be offset from the outfeed end 210*a* along a downward direction D by a distance $D_{2,O}$, where $D_{2,O}$ is greater than zero but less or equal to than $H_{2,O}$. Each outfeed end 210*a* can be vertically aligned with at least one of the discharge end 206*b* of the infeed conveyor 206, the sorting surface 204*f* of a respective one of the sorting stations 204, and the outfeed end 208*a* of a respective one of the first outfeed conveyors 208. Thus, the height $H_{2,O}$ can be substantially equal to at least one of the height $H_I$, the height $H_{S2}$, and the height $H_{1,O}$. Each outfeed end 210*a* can also be spaced from the bottom surface 204*c* of a respective one of the sorting stations 204 by a height $H_{2,O,S}$, where $H_{2,O,S}$ is greater than or equal to zero. The height $H_{2,O,S}$ can be substantially equal to at least one of the height $H_{1,S}$, the height $H_{S1}$, and the height $H_{1,O,S}$. In alternative embodiments, the outfeed end 210*a* need not be vertically aligned with at least one of the discharge end 206*b*, the sorting surface 204*f*, and the outfeed end 208*a*.

For each sorting module 202(*n*), the discharge end 210*b* is substantially vertically aligned with the discharge end 208*b* of the first outfeed conveyor 208. For example, the height $H_{2,D}$ of the discharge end 210*b* of its second outfeed conveyor 210 from the ground can be substantially equal to the height $H_{1,D}$ of the first outfeed conveyor 208 from the ground. In alternative embodiments, the discharge end 210*b* need not be vertically aligned with the discharge end 208*b* of the first outfeed conveyor 208.

Figure 7:
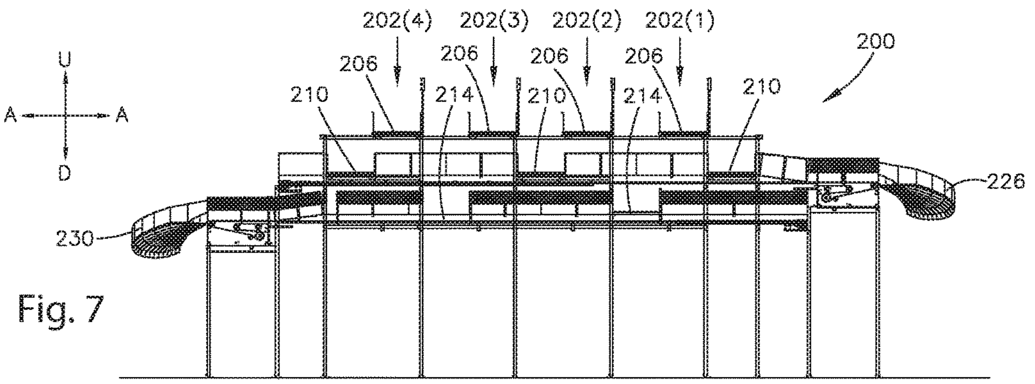
FIG. 7 shows a cross-sectional elevation view of the package sorting system of FIG. 2 taken at section 7-7.

Each second outfeed conveyor 210 is configured to receive packages at its outfeed end 210*a* and to convey packages from its outfeed end 210*a* to its discharge end 210*b* along the forward direction F. The discharge ends 210*b* of the sorting modules 202(*n*) can each be in communication with the second accumulation conveyor 226 that conveys packages from the discharge ends 210*b* towards a staging area (e.g., staging area 244 of FIG. 1). Thus, it can be said that each second outfeed conveyor 210 conveys packages from its outfeed end 210*a* to the second accumulation conveyor 226. At least a portion of the second accumulation conveyor 226 can extend along the lateral direction A (as shown in FIG. 7) such that each second outfeed conveyor 210 is tied into the second accumulation conveyor 226. The second accumulation conveyor 226 can be spaced from the ground by a distance $H_{2,D}$.

Each second outfeed conveyor 210 defines an outfeed conveying surface 210*c* that extends from its outfeed end 210*a* to its discharge end 210*b*. Each second outfeed conveyor 210 includes a plurality of skate wheels define its conveying surface 210*c*. However, in alternative embodiments, each second outfeed conveyor 210 can include any other suitable conveying mechanism such as (without limitation) a slide, rollers, or belt that defines the conveying surface 210*c*.

Each conveying surface 210c can be unpowered and can be configured to move in response to gravity pulling packages down the conveying surface 210c towards its discharge end 210b along the forward direction F. It will also be understood that, in alternative embodiments, the discharge end 210b of each second outfeed conveyor 210 can be at the same elevation as, or at a higher elevation than, the outfeed end 210a of the second outfeed conveyor 210. Additionally or alternatively, in some embodiments, each second outfeed conveyor 210 can be powered, and each conveying surface 210c can be controlled by a motor that moves the conveying surface 210c so as to convey packages along the forward direction F. The motor can in turn be controlled by a controller that controls the speed in which the conveying surface 210c conveys the packages.

Figure 6:
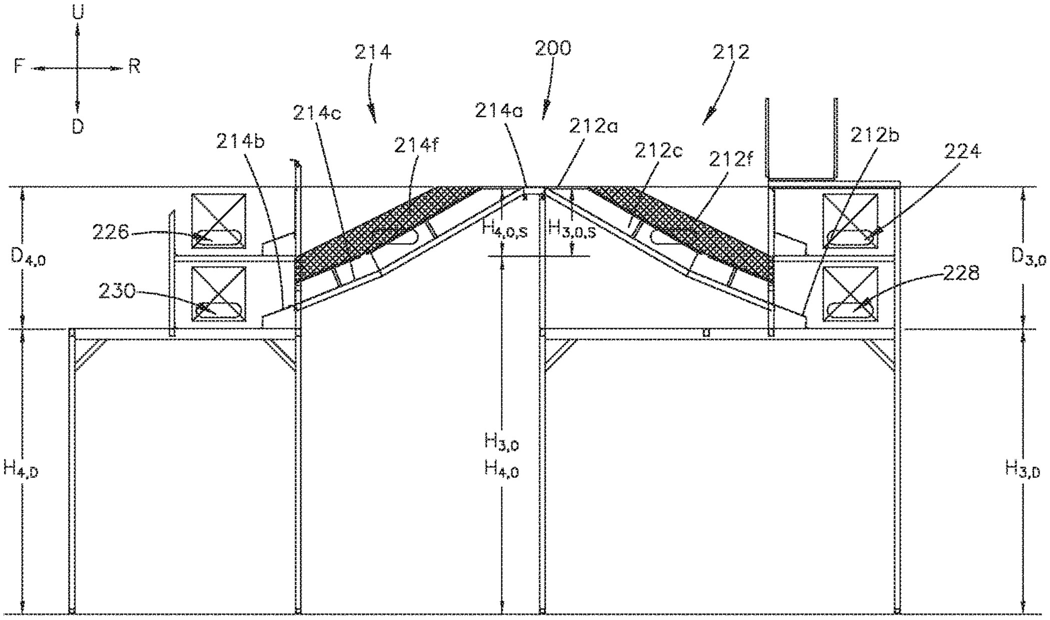
FIG. 6 shows a cross-sectional elevation view of the package sorting system of FIG. 2 taken at section 6-6.

Turning now to FIGS. 2, 3, and 6, each second pair of outfeed conveyors includes third and fourth outfeed conveyors 212 and 214. The third and fourth outfeed conveyors 212 and 214 of each second pair adjoin a different one of the first and second lateral sides 204d and 204e of a respective one of the sorting stations 204 from the first pair. The third and fourth outfeed conveyors 212 and 214 of each second pair can be arranged end-to-end with one another. The third and fourth outfeed conveyors 212 and 214 of each second pair can extend away from one another. For example, the third outfeed conveyor 212 of each second pair can extend away from the fourth outfeed conveyor 214 of the second pair along the rearward direction R. Further, the fourth outfeed conveyor 214 of each second pair can extend away from the third outfeed conveyor 212 of the second pair along the forward direction F.

Each third outfeed conveyor 212 has an outfeed end 212a, and a discharge end 212b offset from the outfeed end 212a along the rearward direction R. Each third outfeed conveyor 212 has a first lateral side 212d, and a second lateral side 212e spaced from the first lateral side 212d along the lateral direction A. The first and second lateral sides 212d and 212e are parallel to one another, although embodiments of the disclosure are not so limited. Each of the first and second lateral sides 212d and 212e can optionally have a sidewall 212f configured to prevent packages from falling off of the third outfeed conveyor 212.

Each third outfeed conveyor 212 extends linearly from its outfeed end 212a to its discharge end 212b along the rearward direction R. Further, each third outfeed conveyor 212 extends away from a respective fourth outfeed conveyor 214 along the rearward direction R. Note that, in alternative embodiments, each third outfeed conveyor 212 can curve as it extends from its outfeed end 212a to its discharge end 212b.

Each outfeed end 212a is disposed closer to the front end 204a of a respective sorting station 204 than to the rear end 204b. For example, each outfeed end 212a can be aligned with the sorting surface 204f at the front end 204a of a respective sorting station 204 along the lateral direction A. Each outfeed end 212a can be additionally or alternatively be vertically aligned with the sorting surface 204f. Further, the outfeed end 212a of each third outfeed conveyor 212 adjoins one of the first and second lateral sides 204d and 204e of a respective one of the sorting stations 204. For example, each outfeed end 212a can extend from the one of the first and second lateral sides 204d and 204e of a respective one of the sorting stations 204 along the lateral direction A. The outfeed end 212a of each third outfeed conveyor 212 can adjoin an outfeed end 214a of a corresponding fourth outfeed conveyor 214. Thus, the outfeed ends 212a and 214a of each second pair of third and fourth outfeed conveyors 212 and 214 can be arranged end-to-end.

Each third outfeed conveyor 212 is declined as it extends from its outfeed end 212a to its discharge end 212b. Thus, the discharge end 212b of each third outfeed conveyor 212 is offset from the outfeed end 212a of the third outfeed conveyor 212 along the downward direction D such that the outfeed end 212a is elevated relative to the discharge end 212b. The outfeed end 212a of each third outfeed conveyor 212 can be spaced from the ground by an outfeed height $H_{3,O}$, and the discharge end 212b of the third outfeed conveyor 212 can be offset from the outfeed end 212a along a downward direction D by a distance $D_{3,O}$, where $D_{3,O}$ is greater than zero but less or equal to than $H_{3,O}$. Each outfeed end 212a can be substantially vertically aligned with at least one of the discharge end 206b, the outfeed end 208a, the outfeed end 210a, and the sorting surface 204f of the respective sorting module 202(n). Thus, the height $H_{3,O}$ can be substantially equal to at least one of the height $H_I$, the height $H_{1,O}$, the height $H_{2,O}$, and the height $H_{S2}$. Each outfeed end 212a can also be spaced from the bottom surface 204c of a respective one of the sorting stations 204 by a height $H_{3,O,S}$, where $H_{3,O,S}$ is greater than or equal to zero. The height $H_{3,O,S}$ can be substantially equal to at least one of the height $H_{I,S}$, the height $H_{1,O,S}$, the height $H_{2,O,S}$ and the height $H_{S1}$. In alternative embodiments, the outfeed end 212a need not be vertically aligned with at least one of the discharge end 206b, the outfeed end 208a, the outfeed end 210a, and the sorting surface 204f of the respective sorting module 202(n).

For each sorting module 202(n), the discharge end 212b is offset from at least one, such as both, of the discharge end 208b and the discharge end 210b with respect to the downward direction D. Thus, at least one of the discharge end 208b and the discharge end 210b can be elevated relative to the discharge end 212b. For example, the height $H_{3,D}$ of the discharge end 212b of its third outfeed conveyor 212 from the ground can be less than the heights $H_{1,D}$ and $H_{2,D}$. In alternative embodiments, the discharge end 212b need not be vertically offset with at least one of the discharge end 208b and the discharge end 210b.

Each third outfeed conveyor 212 is configured to receive packages at its outfeed end 212a and to convey packages from its outfeed end 212a to its discharge end 212b along the rearward direction R. The discharge ends 212b of the sorting modules 202(n) can each be in communication with the third accumulation conveyor 228 that conveys packages from the discharge ends 212b towards at least one staging area (e.g., staging areas 246 and 138 in FIG. 1). Thus, it can be said that each third outfeed conveyor 212 conveys packages from its outfeed end 212a to the third accumulation conveyor 228. At least a portion of the third accumulation conveyor 228 can extend along the lateral direction A (as shown in FIG. 8) such that each third outfeed conveyor 212 is tied into the third accumulation conveyor 228. The third accumulation conveyor 228 can be spaced from the ground by a distance $H_{3,D}$. Further, the third accumulation conveyor 228 can be offset from the first accumulation conveyor 224 along the downward direction D, although embodiments of the disclosure are not so limited. Thus, $H_{3,D}$ can be less than $H_{1,D}$.

Each third outfeed conveyor 212 defines an outfeed conveying surface 212c that extends from its outfeed end 212a to its discharge end 212b. Each third outfeed conveyor 212 includes a slide that defines its conveying surface 212c. However, in alternative embodiments, each third outfeed conveyor 212 can include any other suitable conveying mechanism such as (without limitation) rollers, skate wheels, or a belt that defines the conveying surface 212*c*.

Each conveying surface 212*c* can be unpowered and can be configured to move in response to gravity pulling packages down the conveying surface 212*c* towards its discharge end 212*b* along the rearward direction R. It will also be understood that, in alternative embodiments, the discharge end 212*b* of each third outfeed conveyor 212 can be at the same elevation as, or at a higher elevation than, the outfeed end 212*a* of the third outfeed conveyor 212. Additionally or alternatively, in some embodiments, each third outfeed conveyor 212 can be powered, and each conveying surface 212*c* can be controlled by a motor that moves the conveying surface 212*c* so as to convey packages along the rearward direction R. The motor can in turn be controlled by a controller that controls the speed in which the conveying surface 212*c* conveys the packages.

With continued reference to FIGS. 2, 3, and 6, each fourth outfeed conveyor 214 has an outfeed end 214*a*, and a discharge end 214*b* offset from the outfeed end 214*a* along the forward direction F. Each fourth outfeed conveyor 214 has a first lateral side 214*d*, and a second lateral side 214*e* spaced from the first lateral side 214*d* along the lateral direction A. The first and second lateral sides 214*d* and 214*e* are parallel to one another, although embodiments of the disclosure are not so limited. Each of the first and second lateral sides 214*d* and 214*e* can optionally have a sidewall 214*f* configured to prevent packages from falling off of the fourth outfeed conveyor 214.

Each fourth outfeed conveyor 214 extends linearly from its outfeed end 214*a* to its discharge end 214*b* along the forward direction F. Further, each fourth outfeed conveyor 214 extends away from a respective third outfeed conveyor 212 along the forward direction F. Note that, in alternative embodiments, each fourth outfeed conveyor 214 can curve as it extends from its outfeed end 214*a* to its discharge end 214*b*.

Each outfeed end 214*a* is disposed closer to the front end 204*a* of a respective sorting station 204 than to the rear end 204*b*. For example, each outfeed end 214*a* can be aligned with the sorting surface 204*f* at the front end 204*a* of a respective sorting station 204 along the lateral direction A. Each outfeed end 214*a* can be additionally or alternatively be vertically aligned with the sorting surface 204*f*. Further, the outfeed end 214*a* of each fourth outfeed conveyor 214 adjoins one of the first and second lateral sides 204*d* and 204*e* of a respective one of the sorting stations 204. For example, each outfeed end 214*a* can extend from the one of the first and second lateral sides 204*d* and 204*e* of a respective one of the sorting stations 204 along the lateral direction A. The outfeed end 214*a* of each fourth outfeed conveyor 214 can adjoin an outfeed end 212*a* of a corresponding third outfeed conveyor 212. Thus, the outfeed ends 212*a* and 214*a* of each second pair of third and fourth outfeed conveyors 212 and 214 can be arranged end-to-end.

Each fourth outfeed conveyor 214 is declined as it extends from its outfeed end 214*a* to its discharge end 214*b*. Thus, the discharge end 214*b* of each fourth outfeed conveyor 214 is offset from the outfeed end 214*a* of the fourth outfeed conveyor 214 along the downward direction D such that the outfeed end 214*a* is elevated relative to the discharge end 214*b*. The outfeed end 214*a* of each fourth outfeed conveyor 214 can be spaced from the ground by an outfeed height $H_{4,O}$, and the discharge end 214*b* of the fourth outfeed conveyor 214 can be offset from the outfeed end 214*a* along a downward direction D by a distance $D_{4,O}$, where $D_{4,O}$ is greater than zero but less or equal to than $H_{4,O}$. Each outfeed end 214*a* can be substantially vertically aligned with at least one of the discharge end 206*b*, the outfeed end 208*a*, the outfeed end 210*a*, the outfeed end 212*a*, and the sorting surface 204*f* of the respective sorting module 202(*n*). Thus, the height $H_{4,O}$ can be substantially equal to at least one of the height $H_I$, the height $H_{1,O}$, the height $H_{2,O}$, the height $H_{3,O}$, and the height $H_{S2}$. Each outfeed end 214*a* can also be spaced from the bottom surface 204*c* of a respective one of the sorting stations 204 by a height $H_{4,O,S}$, where $H_{4,O,S}$ is greater than or equal to zero. The height $H_{4,O,S}$ can be substantially equal to at least one of the height $H_{I,S}$, the height $H_{1,O,S}$, the height $H_{2,O,S}$, the height $H_{3,O,S}$, and the height $H_{S1}$. In alternative embodiments, the outfeed end 214*a* need not be vertically aligned with at least one of the discharge end 206*b*, the outfeed end 208*a*, the outfeed end 210*a*, the outfeed end 212*a*, and the sorting surface 204*f* of the respective sorting module 202(*n*).

For each sorting module 202(*n*), the discharge end 214*b* is substantially vertically aligned with the discharge end 212*b* of the third outfeed conveyor 212. For example, the height $H_{4,D}$ of the discharge end 214*b* of the fourth outfeed conveyor 214 from the ground can be substantially equal to the height $H_{3,D}$ of the third outfeed conveyor 212 from the ground. In alternative embodiments, the discharge end 214*b* need not be vertically aligned with the discharge end 212*b* of the third outfeed conveyor 212.

For each sorting module 202(*n*), the discharge end 214*b* is offset from at least one, such as both, of the discharge end 208*b* and the discharge end 210*b* with respect to the downward direction D. Thus, at least one of the discharge end 208*b* and the discharge end 210*b* can be elevated relative to the discharge end 214*b*. For example, the height $H_{4,D}$ of the discharge end 214*b* of the fourth outfeed conveyor 214 from the ground can be less than the heights $H_{1,D}$ and $H_{2,D}$. In alternative embodiments, the discharge end 214*b* need not be vertically offset with at least one of the discharge end 208*b* and the discharge end 210*b*.

Each fourth outfeed conveyor 214 is configured to receive packages at its outfeed end 214*a* and to convey packages from its outfeed end 214*a* to its discharge end 214*b* along the forward direction F. The discharge ends 214*b* of the sorting modules 202(*n*) can each be in communication with the fourth accumulation conveyor 230 that conveys packages from the discharge ends 214*b* towards a staging area (e.g., staging area 242 in FIG. 1). Thus, it can be said that each fourth outfeed conveyor 214 is configured to convey packages from its outfeed end 214*a* to the fourth accumulation conveyor 230. At least a portion of the fourth accumulation conveyor 230 can extend along the lateral direction A (as shown in FIG. 7) such that each fourth outfeed conveyor 214 is tied into the fourth accumulation conveyor 230. The fourth accumulation conveyor 230 can be spaced from the ground by a distance $H_{4,D}$. Further, the fourth accumulation conveyor 230 can be offset from the second accumulation conveyor 226 along the downward direction D, although embodiments of the disclosure are not so limited. Thus, $H_{4,D}$ can be less than $H_{2,D}$.

Each fourth outfeed conveyor 214 defines an outfeed conveying surface 214*c* that extends from its outfeed end 214*a* to its discharge end 214*b*. Each fourth outfeed conveyor 214 includes a slide that defines its conveying surface 214*c*. However, in alternative embodiments, each fourth outfeed conveyor 214 can include any other suitable conveying mechanism such as (without limitation) rollers, skate wheels, or a belt that defines the conveying surface 214*c*.

Each conveying surface 214*c* can be unpowered and can be configured to move in response to gravity pulling packages down the conveying surface 214*c* towards its discharge end 214*b* along the forward direction F. It will also be understood that, in alternative embodiments, the discharge end 214*b* of each fourth outfeed conveyor 214 can be at the same elevation as, or at a higher elevation than, the outfeed end 214*a* of the fourth outfeed conveyor 214. Additionally or alternatively, in some embodiments, each fourth outfeed conveyor 214 can be powered, and each conveying surface 214*c* can be controlled by a motor that moves the conveying surface 214*c* so as to convey packages along the forward direction F. The motor can in turn be controlled by a controller that controls the speed in which the conveying surface 214*c* conveys the packages.

In operation, a package sorter 216 at a sorting station 204 of a sorting module 202(*n*) receives packages along a rearward direction R from the infeed conveyor 206. The package sorter 216 identifies information on each package that corresponds to the ultimate shipping destination of the customer such as a region or zip code. Based on the identified information on each package, the package sorter 216 selects one of the first to fourth outfeed conveyors 208 to 214 of the sorting module 202(*n*), and directs the package to the selected outfeed conveyor. For example, if the sorter 216 selects the first outfeed conveyor 208, then the sorter 216 directs the package along a lateral direction A and the rearward direction R to the first outfeed conveyor 208. If the sorter 216 selects the second outfeed conveyor 210, then the sorter 216 directs the package along the lateral direction A and a forward direction F to the second outfeed conveyor 210. If the sorter 216 selects the third outfeed conveyor 212, then the sorter 216 directs the package along the lateral direction A and the rearward direction R to the third outfeed conveyor 212. If the sorter 216 selects the fourth outfeed conveyor 214, then the sorter 216 directs the package along the lateral direction A and the forward direction F to the fourth outfeed conveyor 214. The sorter 216 can slide each package along the sorting surface 204*f* to the selected outfeed conveyor without lifting the package. Further, the sorter 216 can slide each package along the sorting surface 204*f* to the selected outfeed conveyor such that the sorter 216 physically turns less than 90 degrees.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A package sorting system comprising a sorting module used to sort packages in a package handling facility, the sorting module comprising:

a sorting station configured to support a package sorter, the sorting station having a front end, a rear end spaced from the front end along a rearward direction, a first lateral side, and a second lateral side spaced from the first lateral side along a lateral direction, perpendicular to the rearward direction, the sorting station further having a sorting surface at the front end;

an infeed conveyor having an infeed end, the infeed conveyor extending from the infeed end to the front end of the sorting station along the rearward direction and configured to convey packages from the infeed end to the sorting surface of the sorting station;

a first pair of outfeed conveyors having first and second outfeed conveyors adjoining the first lateral side of the sorting station, the first outfeed conveyor extending away from the second outfeed conveyor along the rearward direction to a first discharge end and configured to convey packages to the first discharge end, and the second outfeed conveyor extending away from the first outfeed conveyor along the forward direction to a second discharge end and configured to convey packages to the second discharge end; and a second pair of outfeed conveyors having third and fourth outfeed conveyors adjoining the second lateral side of the sorting station, the third outfeed conveyor extending away from the fourth outfeed conveyor along the rearward direction to a third discharge end and configured to convey packages to the third discharge end, and the fourth outfeed conveyor extending away from the third outfeed conveyor along the forward direction to a fourth discharge end and configured to convey packages to the fourth discharge end, wherein the sorting module is configured such that the package sorter can receive incoming packages at the sorting surface of the sorting station from the infeed conveyor and selectively place each package from the sorting surface onto one of the first, second, third, and fourth outfeed conveyors.

2. The sorting system of claim 1, wherein the first to fourth outfeed conveyors have first to fourth outfeed ends, respectively, and each of the first to fourth outfeed conveyors is a gravity-fed conveyor that declines as it extends from a respective one of the first to fourth outfeed ends to a respective one of the first to fourth discharge ends.

3. The sorting system of claim 1, wherein the sorting station is between the first and third outfeed conveyors with respect to the lateral direction, and the infeed conveyor is between the second and fourth outfeed conveyors with respect to the lateral direction.

4. The sorting system of claim 1, comprising N instances of the sorting module, each instance of the sorting module configured to share at least one of its first and second pairs of outfeed conveyors with an adjacent instance of the sorting module such that the sorting system comprises [2*(1+N)] total outfeed conveyors, where N is greater than one.

5. A package sorting system comprising a sorting module that comprises:

a sorting station configured to support a package sorter, the sorting station having a front end, a rear end spaced from the front end, a first lateral side, and a second lateral side;

an infeed conveyor having an infeed end, the infeed conveyor extending from the infeed end to the front end of the sorting station and configured to convey packages from the infeed end to the front end of the sorting station;

a first pair of outfeed conveyors having first and second outfeed conveyors, the first outfeed conveyor adjoining the first lateral side to a first discharge end and configured to convey packages to the first discharge end, and the second outfeed conveyor adjoining the first lateral side to a second discharge end and configured to convey packages to the second discharge end; and a second pair of outfeed conveyors having third and fourth outfeed conveyors, the third outfeed conveyor adjoining the second lateral side to a third discharge end and configured to convey packages to the third discharge end, and the fourth outfeed conveyor adjoining the second lateral side to a fourth discharge end and configured to convey packages to the fourth discharge end, wherein the first and second outfeed conveyors are arranged end-to-end with one another, and the third and fourth outfeed conveyors are arranged end-to-end with one another.

6. The sorting system of claim 5, wherein the first and second outfeed conveyors extend away from one another, and the third and fourth outfeed conveyors extend away from one another.

7. The sorting system of claim 6, wherein:

the first outfeed conveyor extends away from the second outfeed conveyor along a rearward direction, and the second outfeed conveyor extends away from the first outfeed conveyor along a forward direction, opposite the rearward direction; and the third outfeed conveyor extends away from the fourth outfeed conveyor along the rearward direction, and the fourth outfeed conveyor extends away from the third outfeed conveyor along the forward direction.

8. The sorting system of claim 6, wherein the sorting station is between the first and third outfeed conveyors with respect to a lateral direction, perpendicular to the rearward direction.

9. The sorting system of claim 6, wherein the infeed conveyor is between the second and fourth outfeed conveyors with respect to the lateral direction.

10. The sorting system of claim 5, wherein the first to fourth outfeed conveyors have first to fourth outfeed ends, respectively, and each of the first to fourth outfeed conveyors is a gravity-fed conveyor that declines from a respective one of the first to fourth outfeed ends to a respective one of the first to fourth discharge ends.

11. The sorting system of claim 10, wherein the first to fourth outfeed ends are vertically aligned with one another.

12. The sorting system of claim 10, comprising a sorting surface at the front end of the sorting station, wherein the first to fourth outfeed ends are aligned with the sorting surface along a lateral direction.

13. The sorting system of claim 5, wherein the infeed conveyor has an inclined conveyor segment that inclines along an infeed direction that extends from the infeed end towards the front end.

14. The sorting system of claim 13, wherein the infeed conveyor has an accumulation conveyor segment that extends between the inclined conveyor segment and the front end, the accumulation conveyor segment declining as it extends along the infeed direction, and the accumulation conveyor segment configured to reduce a speed of packages conveyed along the infeed direction.

15. The sorting system of claim 5, comprising N instances of the sorting module, each instance of the sorting module configured to share at least one of its first and second pairs of outfeed conveyors with an adjacent instance of the sorting module such that the sorting system comprises [2*(1+N)] total outfeed conveyors, where N is greater than one.

16. The sorting system of claim 5, wherein the first to fourth outfeed conveyors have first to fourth outfeed ends, respectively, the sorting system comprises a sorting surface at the front end of the sorting station, and the first to fourth outfeed ends are aligned with the sorting surface along a lateral direction.

17. A package sorting system comprising N instances of a sorting module, each instance comprising:

a sorting station configured to support a package sorter, the sorting station having a front end, a rear end spaced from the front end, a first lateral side, and a second lateral side;

an infeed conveyor having an infeed end, the infeed conveyor extending from the infeed end to the front end of the sorting station and configured to convey packages from the infeed end to the front end of the sorting station;

a first pair of outfeed conveyors having first and second outfeed conveyors, the first outfeed conveyor adjoining the first lateral side to a first discharge end and configured to convey packages to the first discharge end, and the second outfeed conveyor adjoining the first lateral side to a second discharge end and configured to convey packages to the second discharge end; and a second pair of outfeed conveyors having third and fourth outfeed conveyors, the third outfeed conveyor adjoining the second lateral side to a third discharge end and configured to convey packages to the third discharge end, and the fourth outfeed conveyor adjoining the second lateral side to a fourth discharge end and configured to convey packages to the fourth discharge end, wherein each instance of the sorting module is configured to share at least one of its first and second pairs of outfeed conveyors with an adjacent instance of the sorting module such that the sorting system comprises [2*(1+N)] total outfeed conveyors, where N is greater than one.

18. The sorting system of claim 17, comprising first to fourth accumulation conveyors, the first accumulation conveyor configured to receive packages from the first discharge ends of the N instances of the sorting module, the second accumulation conveyor configured to receive packages from the second discharge ends of the N instances of the sorting module, the third accumulation conveyor configured to receive packages from the third discharge ends of the N instances of the sorting module, and the fourth accumulation conveyor configured to receive packages from the fourth discharge ends of the N instances of the sorting module.

19. The sorting system of claim 18, comprising first to fourth staging areas, each staging area corresponding to a different geographic region, the first to fourth accumulation conveyors configured to convey packages to the first to fourth staging areas, respectively.

20. The sorting system of claim 19, wherein each of the first to fourth staging areas comprises a plurality of pallets, each pallet corresponding to a zip code of a corresponding one of the geographic regions.

21. The sorting system of claim 19, wherein the sorting system is a second sorting system that is in communication with a first sorting system, the first sorting system comprising a plurality of staging areas, wherein the plurality of staging areas of the first sorting system includes a shared staging area that is shared between the first and second sorting systems, and the first accumulation conveyor is configured to selectively convey each package that it receives to one of i) the first staging area and ii) the shared staging area.

22. A package sorting system comprising a sorting module that comprises:

a sorting station configured to support a package sorter, the sorting station having a front end, a rear end spaced from the front end, a first lateral side, and a second lateral side;

an infeed conveyor having an infeed end, the infeed conveyor extending from the infeed end to the front end of the sorting station and configured to convey packages from the infeed end to the front end of the sorting station;

a first pair of outfeed conveyors having first and second outfeed conveyors, the first outfeed conveyor adjoining the first lateral side to a first discharge end and configured to convey packages to the first discharge end, and the second outfeed conveyor adjoining the first lateral side to a second discharge end and configured to convey packages to the second discharge end; and a second pair of outfeed conveyors having third and fourth outfeed conveyors, the third outfeed conveyor adjoining the second lateral side to a third discharge end and configured to convey packages to the third discharge end, and the fourth outfeed conveyor adjoining the second lateral side to a fourth discharge end and configured to convey packages to the fourth discharge end, wherein:

the first and second outfeed conveyors extend away from one another, and the third and fourth outfeed conveyors extend away from one another;

the first outfeed conveyor extends away from the second outfeed conveyor along a rearward direction, and the second outfeed conveyor extends away from the first outfeed conveyor along a forward direction, opposite the rearward direction; and the third outfeed conveyor extends away from the fourth outfeed conveyor along the rearward direction, and the fourth outfeed conveyor extends away from the third outfeed conveyor along the forward direction.

23. The sorting system of claim 22, wherein the sorting station is between the first and third outfeed conveyors with respect to a lateral direction, perpendicular to the rearward direction.

24. The sorting system of claim 22, wherein the infeed conveyor is between the second and fourth outfeed conveyors with respect to the lateral direction.

25. A package sorting system comprising a sorting module that comprises:

a sorting station configured to support a package sorter, the sorting station having a front end, a rear end spaced from the front end, a first lateral side, and a second lateral side;

an infeed conveyor having an infeed end, the infeed conveyor extending from the infeed end to the front end of the sorting station and configured to convey packages from the infeed end to the front end of the sorting station;

a first pair of outfeed conveyors having first and second outfeed conveyors, the first outfeed conveyor adjoining the first lateral side to a first discharge end and configured to convey packages to the first discharge end, and the second outfeed conveyor adjoining the first lateral side to a second discharge end and configured to convey packages to the second discharge end;

a second pair of outfeed conveyors having third and fourth outfeed conveyors, the third outfeed conveyor adjoining the second lateral side to a third discharge end and configured to convey packages to the third discharge end, and the fourth outfeed conveyor adjoining the second lateral side to a fourth discharge end and configured to convey packages to the fourth discharge end; and a sorting surface at the front end of the sorting station, wherein:

the first to fourth outfeed conveyors have first to fourth outfeed ends, respectively, and each of the first to fourth outfeed conveyors is a gravity-fed conveyor that declines from a respective one of the first to fourth outfeed ends to a respective one of the first to fourth discharge ends; and the first to fourth outfeed ends are aligned with the sorting surface along a lateral direction.

* * * * *